(12) United States Patent
Hellenthal

(10) Patent No.: US 10,560,281 B2
(45) Date of Patent: Feb. 11, 2020

(54) METHOD FOR TRANSMITTING COMMUNICATION DATA BETWEEN A MULTIPLICITY OF VEHICLE COMPONENTS OF A MOTOR VEHICLE

(71) Applicant: Audi AG, Ingolstadt (DE)

(72) Inventor: Berthold Hellenthal, Schwanstetten (DE)

(73) Assignee: Audi AG, Ingolstadt (DE)

(*) Notice: Subject to any disclaimer, the term of this patent is extended or adjusted under 35 U.S.C. 154(b) by 0 days.

(21) Appl. No.: 16/065,598

(22) PCT Filed: Dec. 21, 2016

(86) PCT No.: PCT/EP2016/002153
§ 371 (c)(1),
(2) Date: Jun. 22, 2018

(87) PCT Pub. No.: WO2017/108184
PCT Pub. Date: Jun. 29, 2017

(65) Prior Publication Data
US 2019/0215185 A1    Jul. 11, 2019

(30) Foreign Application Priority Data
Dec. 22, 2015 (DE) .................. 10 2015 016 704

(51) Int. Cl.
*G07C 5/00*         (2006.01)
*H04L 12/40*        (2006.01)

(52) U.S. Cl.
CPC .... *H04L 12/40* (2013.01); *H04L 2012/40273* (2013.01)

(58) Field of Classification Search
CPC .. G06F 21/606; H04L 61/6027; H04W 12/06; H04W 12/12; H04W 72/0453; H03J 1/0075; H04H 60/42; H04H 60/51
See application file for complete search history.

(56) References Cited

U.S. PATENT DOCUMENTS

| | | | |
|---|---|---|---|
| 7,616,663 B1 * | 11/2009 | Elliott | H04H 20/42 370/474 |
| 2003/0236596 A1 | 12/2003 | Eisenmann et al. | |

(Continued)

FOREIGN PATENT DOCUMENTS

| | | |
|---|---|---|
| DE | 19536379 A1 | 4/1997 |
| DE | 10219439 A1 | 11/2003 |

(Continued)

OTHER PUBLICATIONS

English-language abstract of German Patent Application Publication No. 19536379 A1, published on Apr. 3, 1997; 1 page.

(Continued)

*Primary Examiner* — Mansour Oveissi
(74) *Attorney, Agent, or Firm* — Sterne, Kessler, Goldstein & Fox P.L.L.C.

(57) ABSTRACT

The present disclosure pertains to a method for transmitting communication data between a plurality of vehicle components of a motor vehicle, said vehicle components being coupled via a common communication channel. The present disclosure provides that said vehicle components transmit said communication data between any two of them, wherein one of said vehicle components broadcasts the communication data to be sent by it without demand and without a specific addressee via said communication channel, such that the sent communication data arrive at a plurality or all of the other vehicle components, and at least one of said other vehicle components reads and stores said communication data via said communication channel, if it is in demand thereof, wherein all transmitting vehicle components determine their transmission timings on the basis of a transmission schedule stored in each of said transmitting vehicle components independent from a bus master.

10 Claims, 2 Drawing Sheets

(56) References Cited

U.S. PATENT DOCUMENTS

| | | | |
|---|---|---|---|
| 2004/0203951 A1* | 10/2004 | Mazzara, Jr. | G06F 1/14 |
| | | | 455/466 |
| 2010/0254392 A1 | 10/2010 | Katar et al. | |
| 2010/0296387 A1* | 11/2010 | Jain | G06F 21/606 |
| | | | 370/216 |
| 2013/0136007 A1 | 5/2013 | Jiang et al. | |
| 2015/0016470 A1 | 1/2015 | Stille | |

FOREIGN PATENT DOCUMENTS

| | | |
|---|---|---|
| DE | 10330860 A1 | 2/2005 |
| DE | 102010018994 A1 | 11/2011 |
| DE | 102012204944 A1 | 10/2013 |
| DE | 102014100628 A1 | 7/2014 |
| EP | 2221209 A1 | 8/2010 |

OTHER PUBLICATIONS

English-language abstract of German Patent Application Publication No. 10330860 A1, published on Feb. 10, 2005; 2 pages.
English-language abstract of German Patent Application Publication No. 102010018994 A1, published on Nov. 3, 2011; 6 pages.
English-language abstract of German Patent Application Publication No. 102014100628 A1, published on Jul. 24, 2014; 2 pages.
International Search Report and Written Opinion of the International Search Authority directed to related International Patent Application No. PCT/EP2016/002153, dated Mar. 8, 2017, with attached English-language translation; 20 pages.
International Preliminary Report on Patentability directed to related International Patent Application No. PCT/EP2016/002153, dated Jun. 26, 2018, with attached English-language translation; 14 pages.

\* cited by examiner

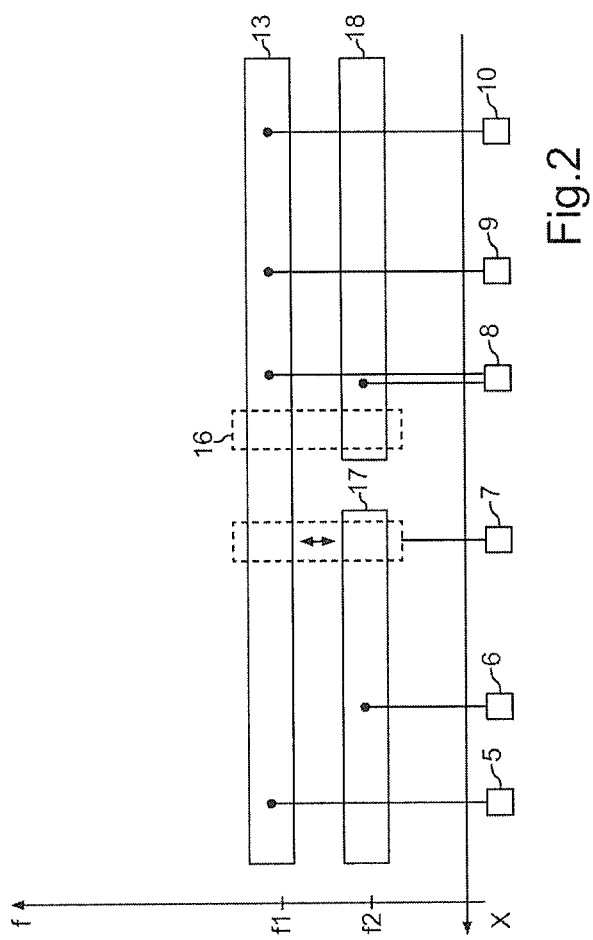

METHOD FOR TRANSMITTING COMMUNICATION DATA BETWEEN A MULTIPLICITY OF VEHICLE COMPONENTS OF A MOTOR VEHICLE

TECHNICAL FIELD

The present invention pertains to a method for transmitting communication data between a multiplicity of vehicle components of a motor vehicle. To this end, the vehicle components are coupled via a common communication channel. The present invention pertains also to a motor vehicle configured to perform said method.

BACKGROUND

In order to enable vehicle components in a motor vehicle, such as control units and sensors, to exchange communication data, a data bus or communication bus is needed. The architecture of such a communication bus defines a flow of said data, that is, it specifies in the first place which vehicle component is allowed to communicate directly or via a gateway with another vehicle component, if any. After determining the vehicle architecture in the course of a development process, the wiring of said vehicle will then be designed accordingly. This procedure does not allow for the flexible, fast development of additional functions before said vehicle enters the serial production stage. Moreover, due to differently equipped vehicle variants, there will be also complex wire harness variants for the respective wirings. In general, complex wire harness render a bus structure heavy and expensive.

From DE 10 2010 018 994 A1, a driver assistance system of a vehicle is known which includes sensors that store respective sensor data in a uniform format in a digital map of the surroundings, from which control units are able to read-out information. Here, all sensor data in said digital map of surroundings are pooled, independent from the specific control unit which will use said sensor data later. Therefore, a direct transmission of sensor data to individual control units is not necessary. A drawback of this solution is that it allows only the transmission of unified sensor data which are able to be rendered on a digital map of surroundings.

From DE 10 2014 100 628 A1, a bus system is known which provides time slots for the transmission of data between individual vehicle components. The time slots are of variable size, respectively, so that these time slots enable the transmission of data frames which have been adjusted based on the communication data to be transmitted. A drawback of said bus system is that each transmitted data frame needs to include a header which describes the structure of the subsequent time slots. This leads to undesirable overhead.

From DE 102 19 439 A1, a control system for a motor vehicle is known, wherein a gateway interconnects a plurality of module buses each of which bundles a subgroup or fraction of the control units of said motor vehicle. The gateway has a modular structure, so that in order to connect a module bus at a later stage, a respective card can be installed retroactively. A disadvantage of the provision of a gateway is that the whole data traffic which is to be exchanged between two module buses has to be routed via said gateway, which may therefore become heavily loaded.

SUMMARY

An object of the present disclosure is to enable a flexible and fast adjustment of communication paths in a motor vehicle, which paths are used by vehicle components for the exchange of communication data.

This object will be solved by the subject matter of the independent claims. Advantageous further developments of the present invention may be learned from the dependent claims, the following description and the figures.

The present disclosure provides a method for transmitting communication data between a multiplicity of vehicle components of a motor vehicle. Said vehicle components are coupled via a common communication channel. Each of said vehicle components may be a control unit or a sensor device or an actuator device, for example. The communication channel may be provided by a wired data bus or a radio link, such as WLAN (Wireless Local Area Network), for example. In order to enable a flexible communication between vehicle components, the present invention contemplates that any two vehicle components transmit communication data between each other by broadcasting the communication data to be sent from one of said vehicle components undemanded, that is, without a request from another vehicle component, and without a specific addressee, via said communication channel, so that said broadcasted communication data will arrive at a plurality or all of the other vehicle components, and having said communication data read and stored by at least one of said other vehicle components in demand of them, via said communication channel. Demand, in this context, means that a control program of said vehicle components indicates that said communication data are required or needed to be processed. By broadcasting the communication data to the other vehicle components without specific addressee it is therefore not necessary to design communication paths. Each vehicle component is able to read and store the respectively needed communication data. In order to avoid data collisions during transmission, all transmitting vehicle components broadcast their communication data at predetermined transmission timings, respectively. That is, said communication data are broadcasted based on time slots. To this end, all transmitting vehicle components determine their transmission timings on the basis of a transmission schedule stored with each transmitting vehicle component independently from a bus master of the communication channel. Said transmission schedule may also be specified in said receiving vehicle components, which therefore know which vehicle component broadcasts at which transmission timing. By specifying the transmission timings within said transmission schedule, it is also possible to guarantee fixed latencies, so that the inventive method is also applicable to control loops or closed-loop control methods or control algorithms. Moreover, routing or relaying of said communication data is not necessary, if the broadcasted communication data can be read by all other vehicle components, since said communication data will arrive at each of said other vehicle components.

Said communication data may be at least one of a group comprising sensor data, actuation data for actuator devices, updated control programs for performing an update of a programmable control device, parameters for setting-up a control device and/or an actuator device, diagnostic data and switch data for switching between functions within a vehicle component.

The present disclosure also describes further developments including features which provide additional advantages.

According to one further development, it is intended to broadcast a new transmission schedule to all vehicle components via said communication channel as a replacement for a transmission schedule currently in use. Stated differently, the transmission timings will be newly specified by said new transmission schedule, for example. This enables an allocation of transmission timings to the transmitting vehicle components. Therefore it becomes possible to, for example, conform to a new priority arrangement by which predetermined vehicle components will be given priority over other vehicle components when it comes to the transmission of communication data.

Thus, it is specifically intended that said new transmission schedule be broadcasted on the basis of an operating status of the motor vehicle. This advantageously makes it possible to take into consideration the driving situation and/or an operating mode of one of said vehicle components. Similarly, it is possible to respond to a data change rate of communication data which are to be sent from a vehicle component. In addition or as an alternative to said transmission times, the new transmission schedule is also able to establish a data protocol according to which said communication data are to be broadcasted. This provides the benefit that said data protocol is also flexible and can be adapted to the data volume of the communication data to be transmitted.

In order to enable only authorized vehicle components to send and/or read-out communication data via the communication channel, an encoding of said communication data by cryptographic encoding may be envisaged. In this context, it is contemplated according to an advantageous further development that there may also be an additional, secret communication between said authorized vehicle components, each of which is able to decode said encoded communication data. To this end, according to a further development it is intended to encode the communication data to be transmitted within a subgroup of said vehicle components, for example between exactly two vehicle components, by point-to-point encoding, so while all vehicle components will be still able to receive said broadcast encoded communication data, only the vehicle components of said subgroup will decode the received communication data. That is, even authorized vehicle components will be prevented from reading or interpreting said communication data by excluding them from said subgroup. Another advantage is that a receiving vehicle component will be able to verify that the encoded communication data stem from a predetermined transmitting vehicle component or must have been broadcasted therefrom, by determining or verifying that they have been correctly encoded.

In a further development, at least one of said vehicle components will not use said read and stored communication data for further processing unless an identity of a vehicle component as a source of said broadcast communication data has been verified. This may be implemented by the above-described point-to-point encoding or, for example, by a component identifier which is broadcast together with said communication data.

According to a further development it is intended that said vehicle component establishes or verifies that a rate of change of an operating status, which is to be caused by said stored communication data within said vehicle component, is admissible at a current timing according to predetermined verification criteria. Stated differently, the vehicle component will not use the read and stored communication data unless the data will cause a change of state within said vehicle component which is admissible at a current timing.

According to a further development it is intended that at least some of said communication data are sent concurrently with a time stamp. This enables a receiving vehicle component to verify if said communication data are still of relevance or up-to-date for it, and discard them, if not.

One further development pertains to the configuration of the communication channel. It implies that said communication channel is implemented at least by an electrical supply line intended to supply said vehicle components with electrical energy. Stated differently, the method including said further development implements a powerline communication. To this end, a positive line and/or a ground line of said vehicle may be used, for example. The use of both lines results in a greater data bandwidth. It is also possible to use sections of said supply line concurrently for transmitting different communication data, by having the vehicle components form between them what is called a MESH net structure wherein the transmission of communication data will end at a vehicle component, but said vehicle component will then forward said received communication data via a different supply line to another vehicle component.

According to a further development it is intended to use a multi-frequency communication method, in particular an OFDM method (OFDM—Orthogonal Frequency-Division Multiplex). The use of a multi-frequency communication method could enable a plurality of vehicle components to broadcast their communication data concurrently.

The use of a multi-frequency communication method could also allow the configuration of communication paths. In this respect, a further development considers the broadcasting of one of said plurality of frequencies of said multi-frequency communication method only to a subgroup or fraction of said vehicle components, while all vehicle components are still coupled in pairs via a common frequency or via a bridge component transmitting the communication data between any two of said frequencies. Therefore, it may be contemplated that all vehicle components are able to communicate via one frequency, while another frequency is only allocated to a subgroup or fraction thereof, so that the same frequency may be used by another subgroup or fraction for the transmission of communication data in another part of the vehicle without interference or disturbance from the first subgroup. This makes it possible to broadcast communication data via said frequency which is only received by the subgroup which is in demand of said communication data.

Optionally, it may also be contemplated to broadcast said communication data packetized by using a compression method, which helps to achieve a greater transmission bandwidth.

It may also be contemplated to add or decouple vehicle components to or from said communication channel during the operation of said communication channel. This implements a hot-plug-in mechanism. Since said method effects a communication that is independent from specific addressees, the transmission performance of transmitting vehicle components is not disturbed by such a hot plug-in.

As already stated, the invention also pertains to a motor vehicle, preferably an automobile, in particular a passenger vehicle. Said motor vehicle includes a multitude of vehicle components of the described type and a communication channel for coupling said vehicle components in order to transmit communication data. Said communication channel is formed primarily by the described at least one electrical supply line which couples said vehicle components in particular with a source of electric energy, for example a vehicle battery and/or a generator. In order to transmit said communication data, said motor vehicle is arranged to perform an embodiment of the inventive method. This enables a flexible configuration of the communication within said motor vehicle, and also a subsequent or short-term reconfiguration thereof without having to change a wiring of the vehicle components.

BRIEF DESCRIPTION OF THE DRAWINGS

Next, an exemplary embodiment of the disclosure is described. In the Figures:

FIG. 2 is a diagram illustrating a communication channel having multiple frequencies of a multi-frequency communication method.

DETAILED DESCRIPTION

Figure 1:
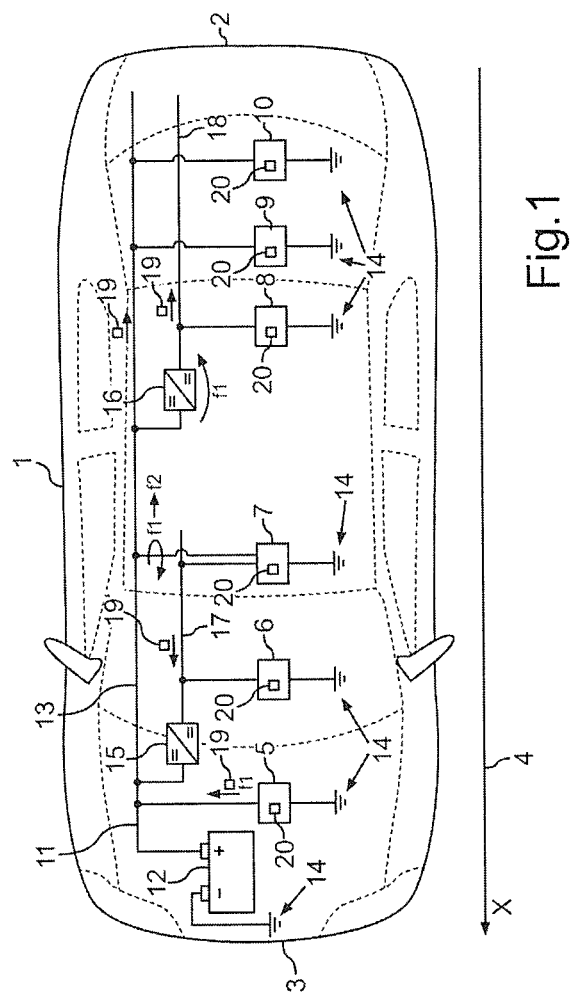
FIG. 1 is a schematic view of an embodiment of the motor vehicle according to the present disclosure.

The exemplary embodiment explained below is a preferred embodiment of the invention. In this exemplary embodiment, each of the described components of said embodiment is an individual feature of the present invention, which has to be considered independently and which is able to develop the present invention further independently, and therefore has to be considered as part of the present invention also by itself and also in a different combination than shown. Moreover, the described embodiment may also be supplemented by additional already described features of the invention.

In the Figures, components of similar function are provided with the same reference numbers.

FIG. 1 shows a motor vehicle 1 that is for example an automobile, in particular a passenger vehicle. For a better understanding, there is illustrated a vehicle longitudinal direction or X-direction from a vehicle rear 2 to a vehicle front 3. The vehicle 1 may include control units 5, 6, 7, 8, 9, 10. The control units 5-10 shown are mere examples. Each of said control units 5-10 is an example of a vehicle component of said motor vehicle 1. In the motor vehicle 1, an electrical onboard power supply may be provided to power the control units 5-10 and to connect said control units 5-10 to an electric energy source 12. To this end, a plus line 13 and a ground line 14 may be provided by said onboard power supply 11, as already known. In particular, said ground line 14 may be formed as a car body ground, e.g. on the basis of grounding bolts, or as a separate, standalone ground return line.

To illustrate another aspect of the invention, it is assumed that the onboard power supply 11 may have additional network branches 17, 18, for example on the basis of DC converters 15, 16. Instead of DC converters 15, 16, at least one switch may be provided, for example. One possible wiring of said control units 5-10 and said onboard power supply 11 is illustrated in FIG. 1 by way of example.

Vehicle components 5-10 in said vehicle 1 exchange communication data while in operation, and FIG. 1 assumes by way of example that the control unit 5 as a transmitting vehicle component broadcasts communication data. In the vehicle 1, the control units 5-10 are not required to be coupled with a bus master via an additional communication bus in order to specifically request said communication data from said control unit 5 and to forward them to the destination device.

In said motor vehicle 1, it is instead intended that the transmitting control unit 5 broadcasts the communication data 19 to all other control unit 6-10 via said onboard power supply. Therefore, the onboard power supply provides a communication channel for exchanging said communication data 19. Moreover, the motor vehicle 1 broadcasts its communication data 19 without a specific addressee and independently of whether one of the other control units 6-10 requires said communication data in the first place.

In the example illustrated in FIG. 1, the control units 5-10 use an OFDM method to transmit communication data, which may serve to modulate said communication data 19 to the supply voltage of said onboard power supply 11. FIG. 1 illustrates that the communication data 19 are broadcasted at a frequency f1 by the control unit 5. Said communication data 19 may arrive directly at said control units 7, 9 and 19 via the positive line 13. By way of example, it is assumed that the DC converter 15 blocks said frequency f1, so that said communication data 19 are not able to arrive directly at the control unit 6. Therefore in this example, the control unit 7 operates as a bridge element which receives the communication data 19 from the positive line 13 and forwards them on the onboard power supply arm 17 as communication data 19' to the control unit 6 at a frequency f2 of said OFDM method As a further illustration, FIG. 1 shows that the DC converter 16 is transparent or transmissive for said frequency f1, so that said communication data 19 arrive at said control unit 8 directly. As an alternative, the DC converter 16 may be provided to block the second frequency f2, so that the control unit 8 is able to communicate with additional control units (not depicted) within the onboard power supply arm 18 at said frequency f2, while said communication data are not able to enter the plus supply line 13.

This is also illustrated in FIG. 2 by means of a frequency scheme of said OFDM method. Guided by the sketch of the motor vehicle 1 according to FIG. 1, the vehicle longitudinal direction X is shown to extend horizontally, while the frequency f of two frequency channels of said OFDM method is shown as the ordinate. The control units 5-10 are able to communicate on the frequency f1 along the entire vehicle length, while the control unit 8 is able to access both frequencies, f1 and f2, via the DC converter 16. The control unit 6, however, is prevented by the DC converter 15 from receiving communication data from the plus supply line 13 on frequencies f1, f2. Here, the control unit 7 as a bridge has to transmit the communication data within the onboard power supply arm 17, the illustrated example also showing a frequency translation from frequency f1 to frequency f2.

Additionally, it is possible to create "isles" or distinct communication areas by a deliberate division of the supply voltage by using corresponding filters with different frequencies in the transmission bands or by using distinct ground return lines.

The control units 5-10 are able to exchange as communication data all data which are exchanged in common motor vehicles via communication buses. The communication data may be sensor data or control data for actuators, for example, or program data for refreshing the operation software of one of said control units 5-10 or for parameterizing or reprogramming said control unit 5-10. Diagnostic data may be exchanged as communication data, too. The data flow via said onboard power supply 11 may also be used to position actuators, but in this case, it may be required for safety reasons that the action data source which broadcasts the communication data for positioning said actuators has identified itself as a reliable data source for the communication data at the vehicle component which includes the actuator to be positioned, and that said vehicle component which includes said actuator has authorized said operational data source. In addition or as an alternative, it may be contemplated that the action identified by said communication data must also be admissible at the current timing (e.g.

during the active operation mode) of the vehicle component, which may be advantageous in case of a motor control as vehicle component. Therefore, the communication data may generally be used to parameterize sensors/actuators and/or to start or to stop local functions within the respective vehicle component.

The communication data may also be broadcasted in compressed form, that is, a packetizing algorithm for reducing the data volume to be transmitted may be implemented.

The communication data may also be exchanged in encoded form, in which case it is preferred to use a dynamic cryptographic key which will be altered in the course of time. This is to guarantee that only vehicle components installed in said vehicle 1 by an authorized dealer and/or an authorized workshop will be able to respond to a modification of the key. In addition to data encryption on the general data flow, single communications may be encoded with a point-to-point encryption.

Broadcasting of communication data 19 to all other control units 6-10 as described above makes all communication data available at every bus member or vehicle component in real time. Here, the transmission behavior of a vehicle component may be adjusted to the respective needs by implementing dynamic real time. Dynamic real time means that the update intervals or refreshing times respectively needed for the communication data will be adjusted. If, for example, a closed-loop control is implemented in the vehicle 1, and if to this end sensor data are to be exchanged between two vehicle components 5-10, said closed-loop control may then require a fixed latency with an update of about one millisecond, for example. Signaling of a tank fuel level, on the other hand, may be done by a tank level sensor every 500 milliseconds. A tire pressure sensor may send every 10 seconds, for example, and may then, in case of a change of the tire pressure at a predetermined lower rate, broadcast the tire pressure every 100 milliseconds. Dynamic real time is determined by data properties, by a driving situation, an operating mode of vehicle components, a rate of change of data (in this case of a changing tire pressure) and/or by data limits, as well as by threshold comparisons.

Each vehicle component may therefore broadcast the communication data to be sent by it via the onboard power supply 11 or generally speaking via the communication channel according to predetermined real-time demands The broadcasted communication data will be able to arrive at all other vehicle components. To this end, vehicle components having sensors will broadcast measurement data, for example, while control units having actuators may broadcast actuator data which describe the condition of the actual actuators. Since all vehicle components see said communication data, they are able to read them out and use them for their own functions, if needed. In order to be able to allocate which communication data are actually broadcasted by a given communication frequency f1, f2, each control unit, that is, generally speaking, each vehicle component is provided with a transmission schedule 20 which indicates which transmitting vehicle component will send at which timing on which transmission frequency. Then, it may be contemplated that the transmission schedule 20 is updated with fixed intervals, for example, meaning that a new transmission schedule is sent to each vehicle component. Thus, transmitting vehicle components become able to change their transmission behavior accordingly and determine receiving vehicle components according to their reception behavior and/or their reception timings.

The basic principle of the communication with said vehicle 1 is therefore that all bus members or vehicle components transparently and directly see all sensor and actuator data and are able to use them freely for their own functions, quasi like in a data democracy. Encrypted communication prevents unauthorized use or misuse of said freely broadcasted communication data. Dynamic real time may serve to adjust the transmission behavior of the vehicle components.

The equitable broadcasting of communication data as described above, which is coordinated only by locally stored transmission schedules, is also called Fog-Computing.

In a motor vehicle, there may also be a plurality of transparent communication channels or so-called fogs. Said communication channels may communicate with each other via a data link, a so-called bridge or bridge element, and provide individual data streams also at the other fog or communication channel, as described for the exemplary control unit 7.

In the motor vehicle 1 illustrated in FIG. 1, vehicle components may also be connected to or disconnected from the onboard power supply 11 in operation via a hot plug-in, such that sensors and actuators may be added or removed without having to adjust the other control units 5-10. Communication data may be provided with time stamps in order to enable the receiving vehicle components to detect how old they are. Communication data may be fed-in with fixed time grids having known latencies, which is of special advantage in the vehicle 1. This will then be determined accordingly by the transmission schedule 20.

A prerequisite for fog computing in the motor vehicle 1 is of course a sufficiently large data bandwidth to be able to provide all data updates or communication data having the shortest real-time demands. To this end, the use of the above-described OFDM method has proven to be beneficial. In particular, it is contemplated to use more than four frequencies If a data bandwidth is insufficient, priority regulations may be provided in order to limit the bandwidth. A flexible data protocol enables a continuous or stepped adjustment between a small data volume (which is of advantage with a parked motor vehicle 1, for example) and a large data volume in order to enable a more energy-effective communication. FIG. 1 illustrates a possible communication channel through a broadband voltage supply or powerline communication (PLC), where both energy supply lines 13, 14 may be used as physical media. Broadcasting and receiving said communication data may for example be embedded within the respective PLC transceivers, and to this end, firmware and/or a hard coding may be contemplated. Another example for a possible communication channel is a wireless communication.

The data link between control units 5-10 is not required to be a direct one, it may rather also be implemented as a MESH architecture, as illustrated at the control unit 7. It has to be noted, however, that such a bridge needs not to perform any routing, that is decide if certain communication data should be passed or not. Without making any decision, the whole data traffic is redirected.

Therefore, all vehicle components see all communication data directly, without an intermediate, and are able to access them without overhead or routing. This makes it possible to implement new, in particular crosslinked and complex, functions at any time, without having to change the data architecture of the onboard power supply, the wiring harness or a gateway. It is possible to alter the function of the motor vehicle 1 at any time simply and without hardware modifications. Vehicle variants with different sensors and/or actuators may easily be constructed and extended, since new components can simply be connected via the energy supply lines and then be integrated into the data traffic via hot plug-in. Updating/flashing, programming and diagnosing of each vehicle component can also be done via a centralized pick-up at the energy supply, that is the onboard power supply 11. Vehicle networks such as CAN, LIN, Flexway, MOST, may be completely omitted or may further be used in parallel. Gateways which are intended to distribute/converse data on the basis of their own decision logic may be omitted. Since said supply lines 13, 14 of said onboard power supply 11 may be used, usual additional data lines may also be omitted.

The use of the communication system as contemplated with the motor vehicle of FIG. 1 is of special advantage for implementing driver assistant systems, since the actuators and sensors may be arranged distributed over the motor vehicle 1, that is distributed among two or three or four mounting spaces, without necessarily causing disadvantages with respect to the fulfillment of their respective functions. In particular, this enables to implement a BCM (body control module) function on the basis of distributed vehicle components.

In summary, this example shows how the present invention is able to provide a transparent, direct, dynamic data, network and safety structure in vehicles on the basis of a fog data processing.

What is claimed:

1. A method for communicating between a plurality of vehicle components of a motor vehicle, the plurality of vehicle components being coupled via a common communication channel, the method comprising:

transmitting, by a first vehicle component, first communication data onto the common communication channel during a first time period of a predetermined transmission schedule;

transmitting, by a second vehicle component, second communication data onto the common communication channel during a second time period of the predetermined transmission schedule;

receiving the first and second communication data by a plurality of other vehicle components via the common communication channel; and reading and storing the first communication data by at least one of the plurality of other vehicle components that needs the first communication data, and the second communication data by at least one of the plurality of other vehicle components that needs the second communication data, wherein the first communication data and the second communication data are broadcast onto the common communication channel without a specific addressee and not in response to a request from any of the plurality of other vehicle components, and wherein the predetermined transmission schedule is stored in each of the transmitting vehicle components.

2. The method according to claim 1, further comprising broadcasting a new transmission schedule which is to replace the predetermined transmission schedule to all vehicle components via the common communication channel.

3. The method according to claim 2, wherein the new transmission schedule is broadcasted based on an operating status of the motor vehicle, and wherein the new transmission schedule establishes a data protocol according to which the first and second communication data are to be broadcasted.

4. The method according to claim 1, wherein within a subgroup of the plurality of vehicle components the communication data to be transmitted are encoded by point-to-point encryption, so that, while all vehicle components are still able to receive the broadcasted encoded communication data, only the vehicle components of the subgroup are capable of decoding the received communication data.

5. The method according to claim 1, wherein at least one of the plurality of vehicle components does not use the read and stored communication data for further processing unless (1) an identity of the at least one vehicle component, which is a source of the broadcasted communication data, has been verified, and/or (2) the at least one vehicle component, which is the source of the broadcasted communication data, has established that a rate of change of an operating status, which is to be caused by the stored communication data is admissible at a current timing according to predetermined verification criteria.

6. The method according to claim 1, wherein at least one of the first communication data or the second communication data are broadcasted concurrently with a time stamp.

7. The method according to claim 1, wherein an electrical supply line provided for supplying the plurality of vehicle components with electric energy or a radio link is provided as the common communication channel.

8. The method according to claim 1, wherein a multi-frequency communication method is used to transmit the communication data via a plurality of frequencies.

9. The method according to claim 8, wherein at least one of the plurality of frequencies is only broadcasted to a subgroup of the plurality of vehicle components, and wherein all of the plurality of vehicle components are coupled between each other as pairs via a common frequency or via a bridge component transmitting the communication data between any two of the plurality of frequencies.

10. A motor vehicle, comprising:

a plurality of vehicle components; and a common communication channel coupling the plurality of vehicle components for communication, wherein the plurality of vehicle components are configured to communicate by:

transmitting first communication data from a first vehicle component onto the common communication channel during a first time period of a predetermined transmission schedule, wherein the first vehicle component broadcasts the communication data without demand and without a specific addressee via the common communication channel;

transmitting second communication data from a second vehicle component onto the common communication channel during a second time period of the predetermined transmission schedule;

receiving the first and second communication data by a plurality of other vehicle components via the common communication channel; and reading and storing the first communication data by at least one of the plurality of other vehicle components that needs the first communication data, and the second communication data by at least one of the plurality of other vehicle components that needs the second communication data, wherein the first communication data and the second communication data are broadcast onto the common communication channel without a specific addressee and not in response to a request from any of the plurality of other vehicle components, and wherein the predetermined transmission schedule is stored in each of the transmitting vehicle components.

* * * * *